US012695212B2

(12) United States Patent
Zhu et al.

(10) Patent No.: US 12,695,212 B2
(45) Date of Patent: Jul. 28, 2026

(54) FOLDED MID BAND DIPOLE WITH IMPROVED LOW BAND TRANSPARENCY

(71) Applicant: John Mezzalingua Associates, LLC, Liverpool, NY (US)

(72) Inventors: Jiaqiang Zhu, Baldwinsville, NY (US); Wengang Chen, Jamesville, NY (US); Niranjan Sundararajan, Clay, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 65 days.

(21) Appl. No.: 18/866,128

(22) PCT Filed: May 16, 2023

(86) PCT No.: PCT/US2023/022345
§ 371 (c)(1),
(2) Date: Nov. 15, 2024

(87) PCT Pub. No.: WO2023/224966
PCT Pub. Date: Nov. 23, 2023

(65) Prior Publication Data

US 2025/0364729 A1 Nov. 27, 2025

Related U.S. Application Data

(60) Provisional application No. 63/342,742, filed on May 17, 2022.

(51) Int. Cl.
*H01Q 21/06* (2006.01)
*H01Q 5/307* (2015.01)
(Continued)

(52) U.S. Cl.
CPC ........... *H01Q 21/062* (2013.01); *H01Q 5/307* (2015.01); *H01Q 21/24* (2013.01); *H01Q 9/065* (2013.01)

(58) Field of Classification Search
CPC ...... H01Q 21/06; H01Q 21/062; H01Q 19/10; H01Q 19/108; H01Q 5/30; H01Q 5/307;
(Continued)

(56) References Cited

U.S. PATENT DOCUMENTS

| | | | | |
|---|---|---|---|---|
| 2017/0250462 | A1* | 8/2017 | Li | H01Q 21/26 |
| 2018/0034165 | A1* | 2/2018 | Aleksandrovich | H01Q 5/392 |

(Continued)

FOREIGN PATENT DOCUMENTS

| | | |
|---|---|---|
| CN | 109103574 A | 12/2018 |
| CN | 110957569 A | 4/2020 |

(Continued)

OTHER PUBLICATIONS

International Search Report and Written Opinion, dated Sep. 15, 2023, received in connection with corresponding International Patent Application No. PCT/US2023/022345.

(Continued)

*Primary Examiner* — Jason M Crawford
(74) *Attorney, Agent, or Firm* — Meunier Carlin & Curfman LLC

(57) ABSTRACT

A midband dipole for a multiband antenna has a plurality of decoupler circuits; a plurality of dipole arms, each having a first region, a second region, and a connecting trace coupling the first region to the second region, wherein the first region is coupled to one of the plurality of decoupler circuits, and the second region is coupled to an adjacent decoupler circuit; and a plurality of suppressor plates, wherein each of the plurality of suppressor plates is coupled to a corresponding first region of a corresponding dipole arm, and each of the plurality of suppressor plates covers a gap between the corresponding dipole arm and an adjacent dipole arm. The midband dipole mitigates resonance from nearby lowband (Continued)

dipoles by suppressing resonance where hot spots might occur in gaps between adjacent dipole arms.

10 Claims, 6 Drawing Sheets

(51) Int. Cl.
*H01Q 21/24* (2006.01)
*H01Q 9/06* (2006.01)

(58) Field of Classification Search
CPC .. H01Q 5/40; H01Q 5/42; H01Q 5/48; H01Q 1/52; H01Q 1/521; H01Q 1/523
See application file for complete search history.

(56) References Cited

U.S. PATENT DOCUMENTS

| | | | | |
|---|---|---|---|---|
| 2020/0373668 | A1 | 11/2020 | Wu et al. | |
| 2022/0077600 | A1 | 3/2022 | Sundararajan et al. | |
| 2022/0200164 | A1* | 6/2022 | Zhu | H01Q 5/48 |
| 2022/0285847 | A1* | 9/2022 | Zhu | H01Q 5/364 |
| 2024/0178564 | A1* | 5/2024 | Himath | H01Q 21/062 |
| 2025/0015489 | A1* | 1/2025 | Bressner | H01Q 1/246 |
| 2025/0364729 | A1* | 11/2025 | Zhu | H01Q 21/06 |

FOREIGN PATENT DOCUMENTS

| | | |
|---|---|---|
| CN | 210468077 | 5/2020 |
| EP | 3886250 | 9/2021 |

OTHER PUBLICATIONS

Extended European Search Report for EP Application No. 23808159.0, dated Mar. 25, 2026.
Li et al. "Self-deoupled Dual-Band Shared-Aperture Base Station Antenna Array," dated Mar. 25, 2022.
Niu et al. "Dual-Band Aperture Shared Antenna Array with Decreased Radiation Pattern Distortion," dated Mar. 25, 2022.

* cited by examiner

FOLDED MID BAND DIPOLE WITH IMPROVED LOW BAND TRANSPARENCY

CROSS REFERENCE TO RELATED APPLICATIONS

This application is a U.S. National Stage application filed under 35 U.S.C. § 371 of PCT/US2023/022345, filed on May 16, 2023, which claims the benefit of priority to U.S. Provisional Application 63/342,742, filed May 17, 2022, which is incorporated by reference herein in its entirety.

BACKGROUND OF THE INVENTION

Field of the Invention

The present invention relates to wireless communications, and more particularly, to multiband antennas with dense dipole array placement.

Related Art

The introduction of new spectrum for cellular communications presents challenges for antenna designers. In addition to the traditional lowband (LB) and midband (MB) frequency regimes (617-894 MHz and 1695-2690 MHz, respectively), the introduction of C-Band and CBRS (Citizens Broadband Radio Service) provides additional spectrum of 3.4-4.2 GHz. Further, there is demand for enhanced performance in the C-Band, including 4×4 MIMO (Multiple Input Multiple Output as well as 8T8R (8-port Transmit, 8-port Receive) with beamforming.

The introduction of new and higher frequency bands, an addition to existing lowband and midband arrays, increases the packing density of dipoles within macro antennas. Given the constraints of weight and wind loading, it is not desirable to increase the size of the antennas to accommodate dipole arrays of the new frequency bands, thereby by driving increased packing densities of dipoles within existing radome designs. However, closer placement of dipoles of different frequency bands leads to performance degradation in the form of cross polarization and gain pattern contamination due to coupling and reradiation between dipoles of different frequency bands. This problem is particularly challenging in the case of RF interaction between midband and lowband dipoles. To complicate this challenge, there is considerable demand for a wide bandwidth in the midband (e.g., 1.7-2.7 GHz), which potentially aggravates the problem of cross polarization between the midband and the lowband.

Increasing packing density presents the considerable challenges, primarily from mutual coupling of dipoles of different frequency bands and the resulting cross polarization and other interference effects. An example of this is when radiation emitted by a lowband dipole causes excitation within portions of a nearby midband dipole, and the subsequent radiation emitted by the midband dipole couples back into the lowband dipole. This may degrade the gain of the lowband dipole as well as induce cross polarization effects. A conventional approach to preventing these interference effects involves increasing the distance between the midband dipoles from the lowband dipoles, but this solution violates the requirement of minimizing antenna wind loading.

Accordingly, what is needed is a midband dipole design that offers strong performance and wide bandwidth while minimizing interference effects with nearby lowband dipoles.

SUMMARY OF THE DISCLOSURE

An aspect of the present disclosure involves a dipole for a multiband antenna. The dipole comprises a plurality of decoupler circuits; a plurality of dipole arms, each having a first region, a second region, and a connecting trace coupling the first region to the second region, wherein the first region is coupled to one of the plurality of decoupler circuits, and the second region is coupled to an adjacent decoupler circuit; and a plurality of suppressor plates, wherein each of the plurality of suppressor plates is coupled to a corresponding first region of a corresponding dipole arm, and each of the plurality of suppressor plates covers a gap between the corresponding dipole arm and an adjacent dipole arm.

DESCRIPTION OF EXEMPLARY EMBODIMENTS

Figure 1:
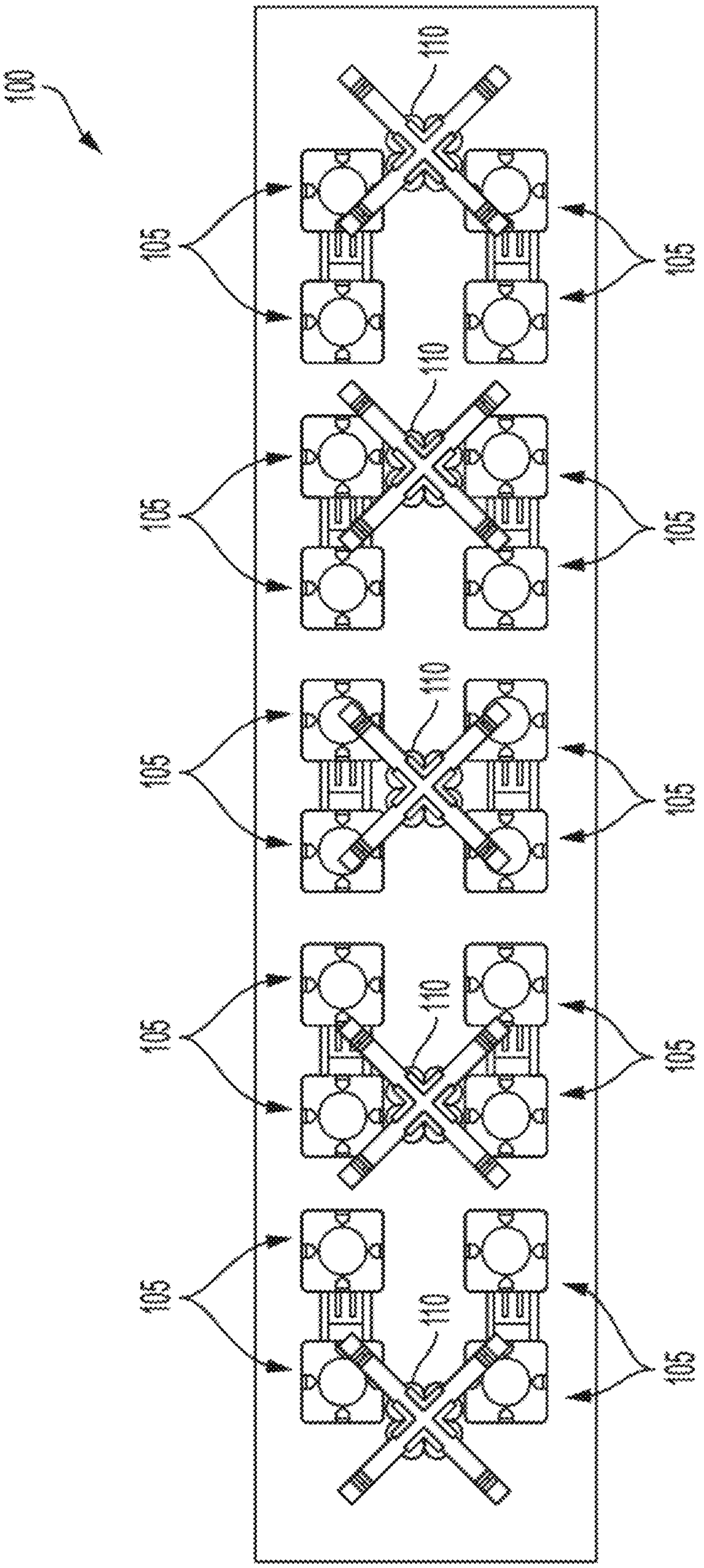
FIG. 1 illustrates an exemplary densely arranged antenna array face having a plurality of lowband dipoles in close proximity to an array of midband dipoles.

FIG. 1 illustrates an exemplary densely arranged antenna array face 100 according to the disclosure. Array face 100 as a plurality of midband dipoles 105 arranged in subarrarys and in close proximity to a plurality of lowband dipoles 110, all of which are arranged on a reflector plate 110. As is apparent in FIG. 1, many of the arms of lowband dipoles 105 directly shadow midband dipoles 105.

Figure 2:
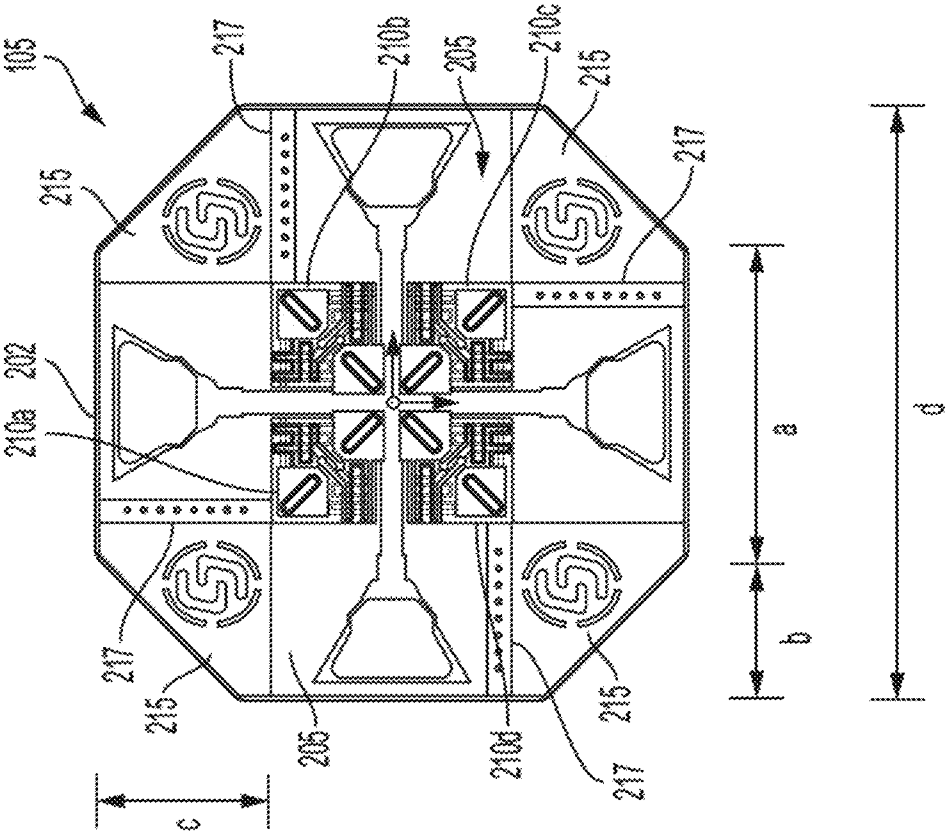
FIG. 2 illustrates an exemplary midband dipole according to the disclosure, showing features present on both sides of a PCB (Printed Circuit Board) that is rendered transparent for the sake of illustration.

FIG. 2 illustrates an exemplary midband dipole 105 according to the disclosure, showing features present on both sides of a PCB 202 that is rendered transparent for the sake of illustration. Midband dipole 105 has four decoupling circuits 210*a*, 210*b*, 210*c*, and 210*d*, each of which is coupled to a dipole arm (illustrated further in FIG. 4). Decoupling circuits 210*a* and 210*c* are each fed a single RF signal via a balun circuit (not shown) whereby the RF signal fed to decoupling circuit 210*c* is 180 out of phase with the RF signal fed to decoupling circuit 210*a*. This causes the RF signal to be radiated by the dipole arms coupled to decoupling circuits 210*a* and 210*c* to be radiated at a −45 polarization. Similarly, decoupling circuits 210*b* and 210*d* are fed a single RF signal (which may be independent of the RF signal fed to decoupling circuits 210*a/c*) via a balun circuit (not shown) whereby the RF signal fed to decoupling circuit 210*d* is 180 out of phase with the RF signal fed to decoupling circuit 210*b*. This causes the RF signal to be radiated by the dipole arms coupled to decoupling circuits 210*b* and 210*d* to be radiated at a +45 polarization.

Decoupling circuits 210*a/b/c/d* each have a two components: an upper component on an upper side of PCB 202 and a complementary lower component disposed on a lower side of PCB 202. Disposed on the lower side of PCB 202 is a conductive pattern 205 that defines four dipole arms (illustrated in FIG. 4). Disposed on the upper side of PCB 202 are four suppressor plates 215 that contribute to mitigating lowband reradiation in midband dipole 105. Each suppressor plate 215 has a row of plated vias 217, which electrically couples each suppressor plate 215 to its corresponding dipole arm.

Exemplary dimensions of midband dipole 105 may include the following. The entire midband dipole 105 may have a width of 70 mm (ref d). The cluster of decoupling circuits 210*a/b/c/d* may have a shape of 30 mm square (ref. a). Each suppressor plate 215 may have a width and height of 20 mm (refs. b and c, respectively), not including its row of plated vias 217. Midband dipole 105 may have a hexagonal shape whereby the 'cut outs' of what would otherwise be the corners of PCB 202 provide a triangular shape to suppressor plates 215. By removing the corners to create a hexagonal shape, the diagonal lengths of the dipole arms are shortened and the footprint of midband dipole 105 is reduced. This further mitigates lowband resonance. It will be understood that these dimensions are exemplary and that variations are possible and within the scope of the disclosure.

Figure 3:
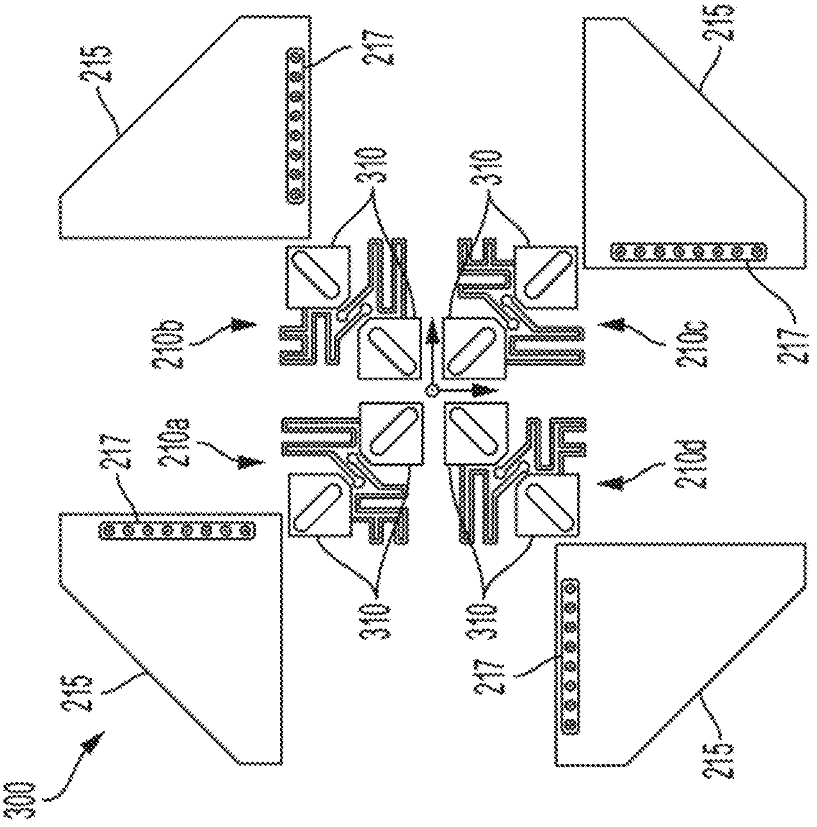
FIG. 3 illustrates an exemplary conductor pattern on an upper side of the PCB of the midband dipole of the disclosure.

FIG. 3 illustrates an exemplary upper conductor pattern 300 on an upper side of PCB 202. Upper conductor pattern 300 includes the four upper components of decoupling circuits 210*a/b/c/d*, and suppressor plates 215 with their corresponding rows of plated vias 217. The upper component of each decoupling circuit 210*a/b/c/d* has two solder pads 310. Each solder pad 310 has a slot through which a balun circuit feeder tab (not shown) may be inserted. Each balun circuit feeder tab may have a conductive trace (not shown) disposed on one side, which may be soldered to corresponding solder pad 310. Accordingly, the balun circuit may be directly coupled to solder pads 310 of the upper component of each decoupling circuit 210*a/b/c/d*. Upper conductor pattern 300 may be formed of copper or another suitable conductor. In an exemplary embodiment, ½ ounce copper may be used.

Figure 4:
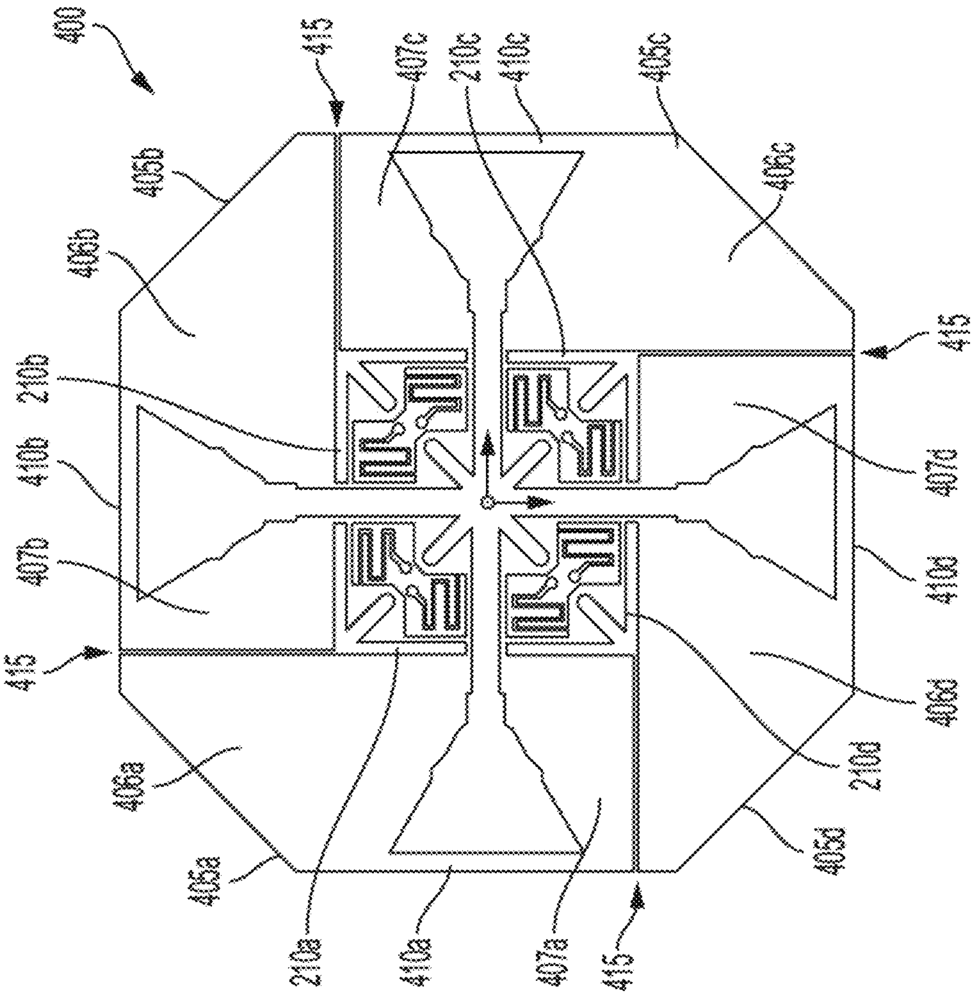
FIG. 4 illustrates an exemplary conductor pattern on a lower side of the PCB of the midband dipole of the disclosure.

FIG. 4 illustrates an exemplary lower conductor pattern 400 disposed on a lower side of PCB 202. Lower conductor pattern 400 includes the four lower components of decoupling circuits 210*a/b/c/d* and four dipole arms 405*a*, 405*b*, 405*c*, and 405*d*. Dipole arm 405*a* has a first region 406*a* and a second region 407*a* that are electrically coupled by connecting trace 410*a*; dipole arm 405*b* has a first region 406*b* and a second region 407*b* that are electrically coupled by connecting trace 410*b*; dipole arm 405*c* has a first region 406*c* and a second region 407*c* that are electrically coupled by connecting trace 410*c*; and dipole arm 405*d* has a first region 406*d* and a second region 407*d* that are electrically coupled by connecting trace 410*d*.

Lower component of decoupling circuit 210*a* is coupled to first region 406*a* of dipole arm 405*a* and second region 407*b* of dipole arm 405*b*; lower component of decoupling circuit 210*b* is coupled to first region 406*b* of dipole arm 405*b* and second region 407*c* of dipole arm 405*c*; lower component of decoupling circuit 210*c* is coupled to first region 406*c* of dipole arm 405*c* and second region 407*d* of dipole arm 405*d*; and lower component of decoupling circuit 210*d* is coupled to first region 406*d* of dipole arm 405*d* and second region 407*a* of dipole arm 405*a*. Adjacent dipole arms 405*a/b/c/d* are separated by a gap 415. Similar to upper conductor pattern 300, lower conductor pattern 400 may be formed of copper or another suitable conductor. In an exemplary embodiment, ½ ounce copper may be used.

Figure 5:
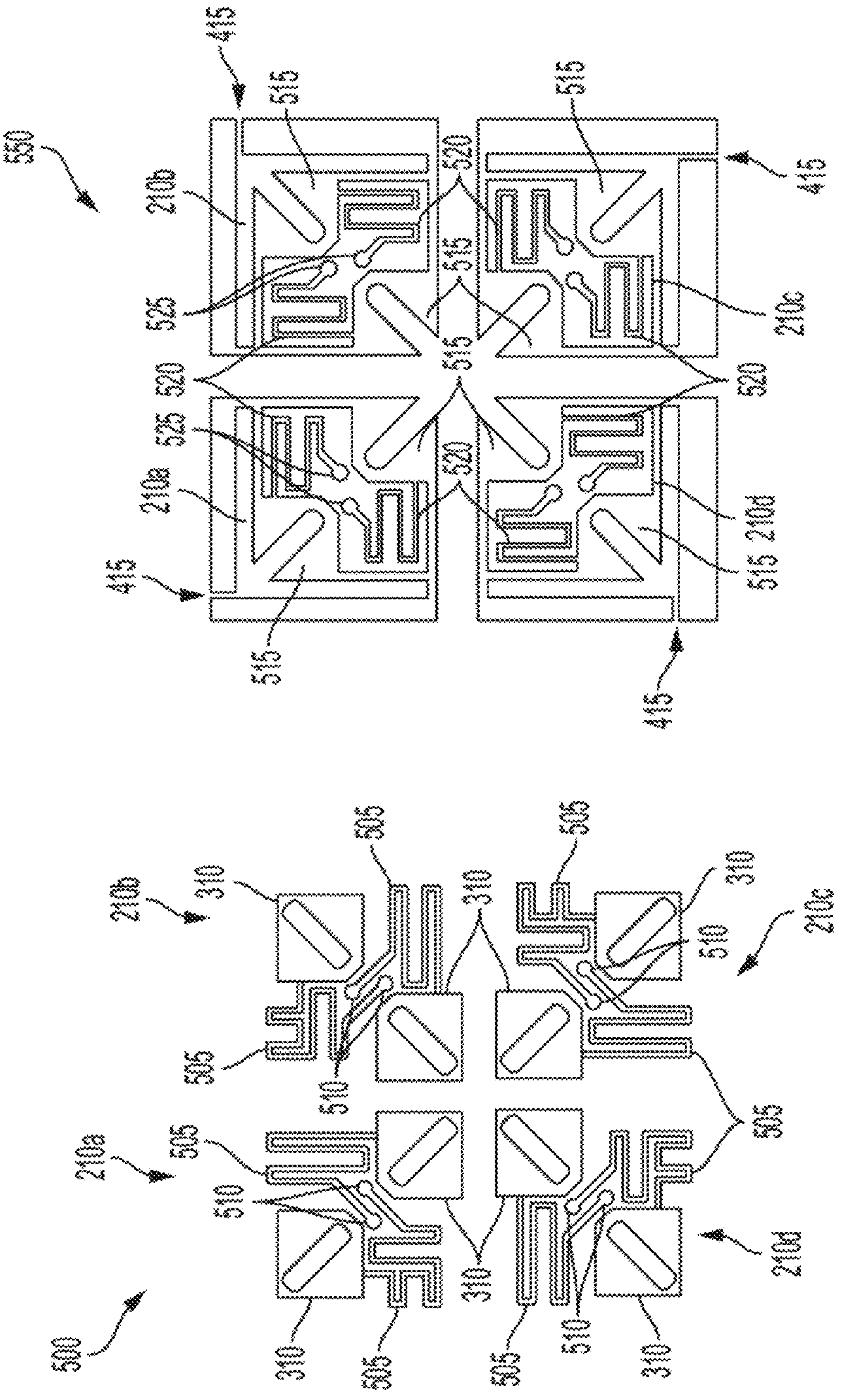
FIG. 5 illustrates an exemplary set of decoupling circuits as implemented on an upper surface and on a lower surface of the PCB of the midband dipole of the disclosure.

FIG. 5 illustrates the upper components 500 of decoupling circuits 210*a/b/c/d* as implemented on upper conductor pattern 300, and the lower components 550 of decoupling circuits 210*a/b/c/d* as implemented on lower conductor pattern 400. Each upper component of 500 of each decoupling circuit 210*a/b/c/d* has two solder pads 310. Coupled to each solder pad 310 is an inductive trace 505, which terminates at a plated via 510. Plated via 510 electrically (and thus inductively) couples to its counterpart via 525 on its lower component 550 of decoupling circuit 210*a/b/c/d*. Further, lower component 550 of decoupling circuit 210*a/b/c/d* has two capacitive coupling pads 515, which capacitively couples to the RF signal fed via balun circuit (not shown) to corresponding solder pad 310 of upper component 500, opposite PCB 202. Each capacitive coupling pad 515 is coupled to an inductive trace 520 that terminates at via 525. As illustrated, lower component 550 of decoupling circuit 210*a* is directly coupled to dipole arms 405*a* and 405*b*; lower component 550 of decoupling circuit 210*b* is directly coupled to dipole arms 405*b* and 405*c*; lower component 550 of decoupling circuit 210*c* is directly coupled to dipole arms 405*c* and 405*d*; and lower component 550 of decoupling circuit 210*d* is directly coupled to dipole arms 405*d* and 405*a*.

Accordingly, a given RF signal fed to solder pad 310 gets both capacitively and inductively fed to a corresponding dipole arm. The capacitive and inductive coupling is tuned so that each decoupling circuit 210*a/b/c/d* resonates in the lowband, thereby cloaking the dipole arms 405*a/b/c/d* so that it is effectively transparent to lowband RF energy emitted by a nearby lowband dipole 110.

Figure 6:
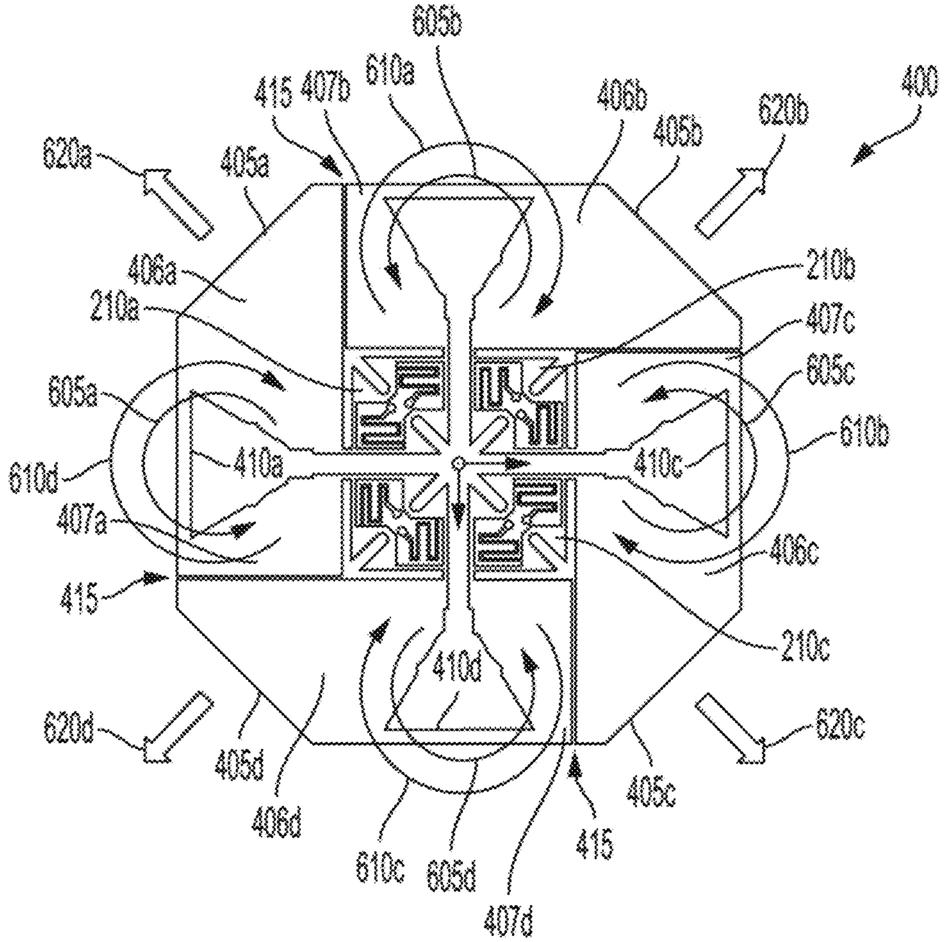
FIG. 6 illustrates an exemplary current flow of RF (Radio Frequency) signals in the lower conductor pattern to achieve two independent cross polarized midband signals according to the disclosure.

FIG. 6 illustrates an exemplary current flow of RF (Radio Frequency) signals in lower conductor pattern 400 to achieve two independent cross polarized midband signals according to the disclosure. The RF signal flows occur as follows.

A first RF signal gets fed to decoupling circuit 210*a* at solder pads 310 and is passed through to dipole arms 405*a* and 405*b* by two mechanisms: (1) the RF signal gets capacitively coupled to capacitive coupling pads 515 through PCB 202, and (2) the RF signal gets inductively coupled through inductive traces 505, vias 510/515, and inductive traces 520. From decoupling circuit 210*a*, the first RF signal, depicted as current flow 605*a*, conducts through first region 406*a* and connecting trace 410*a* to second region 407*a* of dipole arm 405*a*. Also, the first RF signal, depicted as current flow 610*a*, conducts through second region 407*b* and connection trace 410*b* to first region 406*b* of dipole arm 405*b*. The combined current flows 605*a* and 610*a* radiate the first RF signal with a −45 degree polarization illustrated as 620*a*.

The same first RF signal, phase shifted by 180 degrees, gets fed to decoupling circuit 210*c* at solder pads 310 and is passed through to dipole arms 405*c* and 405*d* by two mechanisms: (1) the RF signal gets capacitively coupled to capacitive coupling pads 515 through PCB 202, and (2) the RF signal gets inductively coupled through inductive traces 505, vias 510/515, and inductive traces 520. From decoupling circuit 210*c*, the phase shifted first RF signal, depicted as current flow 605*c*, conducts through first region 406*c* and connecting trace 410*c* to second region 407*c* of dipole arm 405*c*. Also, the phase shifted first RF signal, depicted as current flow 610*c*, conducts through second region 407*d* and connecting trace 410*d* to first region 406*d* of dipole arm 405*d*. The combined current flows 605*c* and 610*c* radiate the first RF signal with a −45 degree polarization illustrated as 620*c*. The radiated signals 620*a* and 620*c* combine to form a single −45 degree polarized first RF signal.

A second RF signal gets fed to decoupling circuit 210*b* at solder pads 310 and is passed through to dipole arms 405*b* and 405*c* by two mechanisms: (1) the RF signal gets capacitively coupled to capacitive coupling pads 515 through PCB 202, and (2) the RF signal gets inductively coupled through inductive traces 505, vias 510/515, and inductive traces 520. From decoupling circuit 210*b*, the first RF signal, depicted as current flow 605*b*, conducts through first region 406*b* and connecting trace 410*b* to second region 407*b* of dipole arm 405*b*. Also, the first RF signal, depicted as current flow 610*b*, conducts through second region 407*c* and connection trace 410*c* to first region 406*c* of dipole arm 405*c*. The combined current flows 605*b* and 610*b* radiate the first RF signal with a −45 degree polarization illustrated as 620*b*.

The same second RF signal, phase shifted by 180 degrees, gets fed to decoupling circuit 210*d* at solder pads 310 and is passed through to dipole arms 405*d* and 405*a* by two mechanisms: (1) the RF signal gets capacitively coupled to capacitive coupling pads 515 through PCB 202, and (2) the RF signal gets inductively coupled through inductive traces 505, vias 510/515, and inductive traces 520. From decoupling circuit 210*d*, the phase shifted first RF signal, depicted as current flow 605*d*, conducts through first region 406*d* and connecting trace 410*d* to second region 407*d* or dipole arm 405*d*. Also, the phase shifted second RF signal, depicted as current flow 610*d*, conducts through second region 407*a* and connecting trace 410*a* to first region 406*a* of dipole arm 405*a*. The combined current flows 605*d* and 610*d* radiate the second RF signal with a +45 degree polarization illustrated as 620*d*. The radiated signals 620*b* and 620*d* combine to form a single +45 degree polarized first RF signal.

What is not illustrated in FIG. 6 are the suppressor plates 215 that are electrically coupled to dipole arms 405*a*/*b*/*d*/*d*. Suppressor plates 215 take the respective currents flowing through the dipole arm 405*a*/*b*/*c*/*d* to which it is coupled and contribute to the radiation of respective radiated signals 620*a*/*b*/*c*/*d*, while also shielding gaps 415 to prevent incident lowband radiation from nearby lowband dipole 110 from forming hot spots and thus contaminating the gain and radiation pattern of nearby lowband dipole 110.

What is claimed is:

1. A dipole for a multiband antenna, comprising:
- a plurality of decoupler circuits;
- a plurality of dipole arms, each having a first region, a second region, and a connecting trace coupling the first region to the second region, wherein the first region is coupled to one of the plurality of decoupler circuits, and the second region is coupled to an adjacent decoupler circuit; and
- a plurality of suppressor plates, wherein each of the plurality of suppressor plates is coupled to a corresponding first region of a corresponding dipole arm, and each of the plurality of suppressor plates covers a gap between the corresponding dipole arm and an adjacent dipole arm.

2. The dipole of claim 1, further comprising a PCB (Printed Circuit Board) on which the plurality of decoupler circuits, the plurality of dipole arms, and the plurality of suppressor plates are disposed.

3. The dipole of claim 2, where the PCB has a hexagonal shape.

4. The dipole of claim 2, wherein each of the plurality of decoupler circuits has a first component disposed on a first side of the PCB and a second component disposed on a second side of the PCB, wherein the plurality of dipole arms are disposed on the second side and the suppressor plates are disposed on the first side.

5. The dipole of claim 4, wherein each of the suppressor plates are coupled to its corresponding dipole arm by a row of plated vias through the PCB.

6. The dipole of claim 4, wherein the first side is an upper side of the PCB, and the second side is a lower side of the PCB.

7. The dipole of claim 4, wherein the first component of each of the plurality of decoupler circuits comprises:
- a solder plate;
- an a first side inductive trace coupled to the solder plate; and
- a first side plated via coupled to the first side inductive trace.

8. The dipole of claim 7, wherein the second component of each of the decoupler circuits comprises:
- a capacitive plate disposed opposite the solder plate;
- a second side inductive trace coupled to the capacitive plate; and
- a second side plated via coupled to the second side inductive trace, the second side plated coupled to the first side plated via.

9. The dipole of claim 4, wherein the first component of each of the plurality of decoupler circuits comprises:
- a first solder plate and a second solder plate;
- a first first side inductive trace coupled to the first solder plate;
- a second first side inductive trace coupled to the second solder plate;
- a first first side plated via coupled to the first first side inductive trace; and
- a second first side inductive trace coupled to the second first side inductive trace.

10. The dipole of claim 9, wherein the second component of each of the decoupler circuits comprises:
- a first capacitive plate and a second capacitive plate, wherein the first capacitive plate is disposed opposite the first solder plate and the second capacitive plate is disposed opposite the second solder plate;
- a first second side inductive trace coupled to the first capacitive plate;
- a second second side inductive trace coupled to the second capacitive plate;
- a first second side plated via coupled to the first second side inductive trace, the first second side plated via coupled to the first first side plated via; and
- a second second side plated via coupled to the second second side inductive trace, the second second side plated via coupled to the second first side plated via.

* * * * *